United States Patent [19]

Dobreski

[11] Patent Number: 4,826,920

[45] Date of Patent: May 2, 1989

[54] FILMS OF LINEAR ETHYLENE POLYMER, POLYSTYRENE, AND HIGH IMPACT POLYSTYRENE

[75] Inventor: David V. Dobreski, Fairport, N.Y.

[73] Assignee: Mobil Oil Corporation, New York, N.Y.

[21] Appl. No.: 134,640

[22] Filed: Dec. 18, 1987

[51] Int. Cl.$^4$ .................. C08L 9/06; C08L 24/08; C08L 51/04
[52] U.S. Cl. ........................................ 525/86; 525/240
[58] Field of Search .................. 525/232, 240, 86

[56] References Cited

U.S. PATENT DOCUMENTS

| | | | |
|---|---|---|---|
| 4,125,573 | 11/1978 | Kruse | 525/244 |
| 4,334,039 | 6/1982 | Dupre | 525/244 |
| 4,579,912 | 4/1986 | Canterino et al. . | |
| 4,743,649 | 5/1988 | Dobreski . | |

*Primary Examiner*—Allan M. Lieberman
*Attorney, Agent, or Firm*—Alexander J. McKillop; Charles J. Speciale

[57] ABSTRACT

Films of linear ethylene polymers, particularly copolymers of ethylene and alpha-olefins of 4 to 10 carbon atoms (LLDPE), containing up to about 15 weight percent of a 1:3 to 3:1 ratio of polystyrene or poly(paramethylstyrene), and impact polymer, e.g., impact polystyrene, exhibit excellent film properties and improved blocking.

20 Claims, No Drawings

FILMS OF LINEAR ETHYLENE POLYMER, POLYSTYRENE, AND HIGH IMPACT POLYSTYRENE

BACKGROUND OF THE INVENTION

Linear ethylene polymers, particularly linear low density polyethylene (LLDPE) are widely used commercially in films. The films are conventionally prepared by blow film extrusion and have generally good properties but often exhibit undesirably low stiffness for some uses and have marginal machine direction tear and puncture tear propagation characteristics. U.S. Pat. No. 4,579,912, which is incorporated by reference, discloses the use of polystyrene or poly(para-methylstyrene) to improve tear strength and stiffness. It was also found that the addition of polystyrene resin also improved the blocking characteristics and reduced the splittiness as measured by machine direction puncture propagation of the film making it particularly suitable for bags and the like. Later, as disclosed in my U.S. application Ser. No. 902,718, filed Sept. 02, 1986, now U.S. Pat. No. 4,743,649, which is incorporated herein by reference, I discovered that high impact polystyrene (HIPS) gave unexpectedly better anti-blocking properties than crystal polystyrene when added in small amounts to linear ehtylene polymers such as LLDPE.

This invention is based on the observation that better balance of blocking characteristics and other film properties than obtained with polystyrene addition of impact polymer (HIPS) addition can be achieved using both polystyrene and an impact polystyrene or impact poly(-para-methylstyrene) resin.

SUMMARY OF THE INVENTION

Films prepared from linear ethylene polymers, particularly linear ethylene copolymers of ethylene and alpha-olefins having 4 to 10 carbon atoms, are blended with up to about 15 weight percent of a mixture of polystyrene or poly(para-methylstyrene) and an impact polystyrene or impact poly(para-methylstyrene) containing 1 to 20 weight percent of rubber.

DETAILED DESCRIPTION OF THE INVENTION

The major component of the films of this invention is a linear polymer of ethylene having a density of from about 0.85 to about 0.96 and can be a homopolymer or a copolymer. Suitable copolymers are copolymers of ethylene and alpha-olefins containing 4 to 10 carbon atoms. Polymers having a density between 0.90 and 0.94, preferably between 0.91 and 0.93, referred to as linear low density polyethylenes (LLDPE) are particularly suitable. Copolymers of ethylene and 1-butene, 1-hexene, 1-octene and 4-methyl-1-pentene are commercially important, and widely available.

The impact polymers which are used in this invention are also commercially available. Suitable impact polymers are prepared by polymerizing a styrene or para-methylstyrene monomer in the presence of a rubber such as polybutadiene with a free radical catalyst such as benzoylperoxide under conditions which promote grafting of polystyrene or poly(para-methylstyrene) onto the rubber backbone. The rubber generally comprises 1 to 20 weight percent, preferably 4 to 10 weight percen tof the polymer. Impact polymers containing high rubber contents, e.g., 18 weight percent and 5 micron particles give films with excellent blocking but result in reduced modulus (stiffness). Therefore, if high modulus is desired, impact polymers with rubber contents below about 10 weight percent are desirable. Polybutadiene is the preferred rubber but other rubbers and rubbery polymers and copolymers can be used as the backbone of the impact polymer. Impact resins of polystyrene and the like can vary considerably, not only in the rubber content but also in the particle size of the dispersed rubber particles. Generally, particle diameters of 2 to 20 microns are suitable but is has been found that larger particle sizes in excess of 4 microns are advantageous and such impact polymers are therefore preferred.

The total amount of the polystyrene or poly(para-methylstyrene) impact polymer can comprise up to about 15 weight percent or even more of the composition. However, the character of the film changes markedly when amounts much larger than about 10 weight percent of the total of polystyrene and the impact polymer are present. At amounts below about 10 weight percent, for example at 5 weight percent, the film exhibits excellent physical properties such as tear strength. At higher amounts, for example at 15 weight percent of a HIPS resin having a low rubber content, the film is somewhat stiffer and has the tear and fold characteristics of paper. At either high or low levels the film exhibits good anti-block which is considered an important advantage of this invention over known films where polystyrene is used alone as an additive. The weight ratio of polystyrene or poly(para-methylstyrene)to the impact polymer is generally 3:1 to 1:3 and preferably about 1:1.

The unexpectedly good blocking characteristics of the films of this invention and their other physical properties particularly stiffness (secant modulus) make the films particularly suitable for the production of thin bags of a gauge of less than 1 mil. The superior blocking qualities of the bags contributes to their easy opening characteristics, an important consideration during use. Also, because the blocking characteristics are improved, it is possible to decrease or remove conventional inorganic anti-block agents which are generally detrimental to physical properties, add high a impact polymer and produce a film with better ultimate tensile, puncture and MD tear strength than virgin LLDPE with inorganic anti-block agent.

The invention is illustrated by the following non-limiting examples in which all parts are by weight unless otherwise indicated.

EXAMPLE

This example illustrates the production of an LLDPE film containing a HIPS/PS mixture according to this invention to films of LLDPE alone, LLDPE and PS, and LLDPE and HIPS.

A 3/4 inch Brabender laboratory extruder was used to prepare 1.5 mil films of each of LLDPE, LLDPE and 6 weight percent crystal polystyrene (PS 2820), LLDPE and HIPS, and LLDPE and a 6 percent weight percent 1:1 mixture of crystal polystyrene and HIPS. The films were evaluated for Elmendorf Tear Strength, TEDD (Total Energy Dart Drop), machine direction (MD), 1% MD secant modulus and blocking, and the extruder torque was noted. The results are summarized in the Table.

TABLE

| Example | LLDPE | HIPS | PS | HIPS/PS |
|---|---|---|---|---|
| ETS MD g/mil TD | 384 642 | 395 589 | 342 684 | 356 634 |
| TEDD in.-lb. | 19.1 | 25.4 | 28.9 | 27.1 |
| Sec. Mod. psi | 32,400 | 36,900 | 48,100 | 42,500 |
| Blocking (grams) | 154 | 29 | 187 | 22 |
| Extruder Torque N-M | 5,000 | 4,400 | 4,400 | 4,200 |

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

I claim:

1. A film comprising a linear ethylene polymer having a density in the range of from about 0.85 to about 0.96 and a total of up to about 15 weight percent of a mixture of (A) polystyrene or poly(paramethylstyrene) and (B) an impact polymer which is an impact polystyrene or impact poly(para-methylstyrene) containing 1 to 20 weight percent of rubber, in a weight ratio of (A) to (B) 1:3 to 3:1.

2. The film of claim 1 in which said linear ethylene polymer is a copolymer of ethylene and an alpha-olefin having 4 to 10 carbon atoms having a density in the range from about 0.90 to about 0.94.

3. The film of claim 1 in which said linear ethylene polymer is a copolymer of ethylene and an alpha-olefin having 4 to 8 carbon atoms having a density in the range of from about 0.91 to about 0.94, and said polymer is impact polystyrene.

4. The film of claim 1 in which said linear ethylene polymer is a copolymer of ethylene and an alpha-olefin having 4 to 10 carbon atoms having a density in the range from about 0.90 to about 0.94 and said impact polymer is impact poly(para-methylstyrene).

5. The film of claim 1 in which said impact polymer comprises up to 8 percent by weight of the composition.

6. The film of claim 1 in which said impact polymer is impact polystyrene and said rubber is polybutadiene.

7. The film of claim 2 in which said impact polymer is impact polystyrene and said rubber is polybutadiene.

8. The film of claim 5 in which said impact polymer is impact polystyrene and said rubber is polybutadiene.

9. The film of claim 1 in which said impact polymer contains rubber particles having an average particle diameter of 2 to 20 microns.

10. The film of claim 2 in which said impact polymer contains rubber particles having an average particle diameter of 2 to 20 microns.

11. The film of claim 3 in which said impact polymer contains rubber particles having an average particle diameter of 2 to 20 microns.

12. The film of claim 6 in which said impact polymer contains rubber particles having an average particle diameter of 2 to 20 microns.

13. The film of claim 1 in which said linear ethylene polymer is a copolymer of ethylene and butene, said impact polymer is impact polystyrene and said rubber is polybutadiene.

14. The film of claim 1 in which said linear ethyelen polymer is a copolymer of ethylene and hexene, said impact polymer is impact polystyrene and said rubber is polybutadiene.

15. The film of claim 1 in which said linear ethylene polymer is a copolymer of ethylene and octene, said impact is impact polystyrene and said rubber is polybutadiene.

16. The film of claim 9 in which said linear ethylene polymer is a copolymer of ethylene and butene, said impact polymer is impact polystyrene and said rubber is polybutadiene.

17. The film of claim 10 in which said linear ethylene polymer is a copolymer of ethylene and hexene, said impact polymer is impact polystyrene and said rubber is polybutadiene.

18. The film of claim 11 in which said linear ethylene polymer is a copolymer of ethylene and octene, said impact polymer is impact polystyrene and said rubber is polybutadiene.

19. The film of claim 1 in which the rubber comprises 4 to 10 weight percent of the impact polymer.

20. The film of claim 3 in which the rubber comprises 4 to 10 weight percent of the impact polymer.

* * * * *

UNITED STATES PATENT AND TRADEMARK OFFICE
CERTIFICATE OF CORRECTION

PATENT NO. : 4,826,920

DATED : May 2, 1989

INVENTOR(S) : David V. Dobreski

It is certified that error appears in the above-identified patent and that said Letters Patent is hereby corrected as shown below:

Column 2, line 56, after "invention" insert -- having a 30% higher secant modulus with excellent anti-block as compared --.

Signed and Sealed this

Twenty-seventh Day of February, 1990

Attest:

JEFFREY M. SAMUELS

Attesting Officer    Acting Commissioner of Patents and Trademarks